R. LEHMICKE.
Blinders for Horses.
No. 126,218. Patented April 30, 1872.
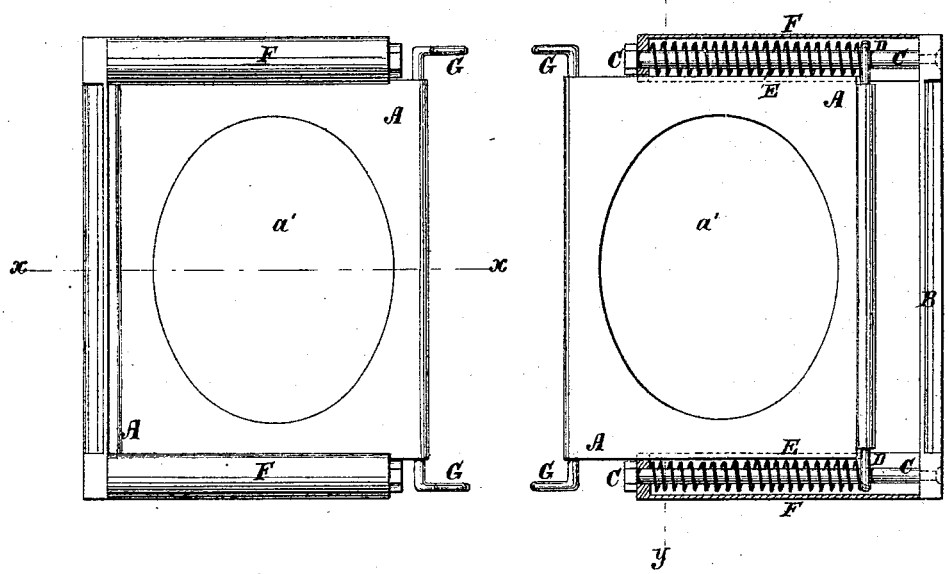
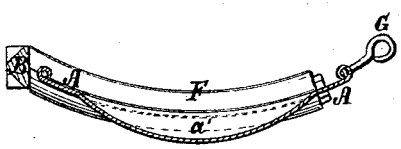
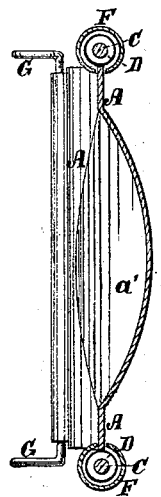
Witnesses:
A Bennerkendorf
Geo. W. Mabee
Inventor:
Rudolph Lehmicke
PER ― Attorneys.

UNITED STATES PATENT OFFICE.

RUDOLPH LEHMICKE, OF STILLWATER, MINNESOTA.

IMPROVEMENT IN BLINDERS FOR HORSES.

Specification forming part of Letters Patent No. 126,218, dated April 30, 1872.

Specification describing the new and useful Improvement in Horse-Blinders, invented by RUDOLPH LEHMICKE, of Stillwater, in the county of Washington and State of Minnesota.

Figure 1 is a front view of a pair of blinders, one being shown as partly extended and partly in section, to show the construction. Fig. 2 is a detail cross-section of the same taken through the line $x\,x$, Fig. 1. Fig. 3 is a detail longitudinal section of the same taken through the line $y\,y$, Fig. 1.

Similar letters of reference indicate corresponding parts.

My invention has for its object to furnish improved horse-blinders or blinkers, which shall be so constructed that they may be readily and conveniently drawn forward and down over the horse's eyes when necessary to bring him under control; and it consists in the construction and combination of the various parts of the blinders, as hereinafter more fully described.

A is the plate of the blinder, which is curved or bent into the form of a portion of the shell of a hollow cylinder, and has a projection or boss upon its outer side, and a corresponding depression, recess, or cavity, $a'$, upon its inner side, as shown in Figs. 1, 2, and 3, so as not to rub or chafe the horse's eyes when drawn down closely over them. B is the bar which is attached to the head-stall to support the blinder. To the upper and lower ends of the bar B are attached the ends of two bars, C, which project forward at right angles with the bar B, and which are curved to correspond with the curvature of the plate A. The plate A is connected with the arms C by the eyes or lugs D formed upon or attached to the plates A at the ends of its rear edge, and through which the arms or bars C pass, as shown in Fig. 1. Upon the arms C, in front of the eyes D, are placed coiled wire springs E, the rear ends of which rest against the said eyes D, and their forward ends are supported by nuts screwed upon the ends of the arms C. The springs E should have sufficient power to force and hold the plate A back against the bar B when not drawn forward for use. The arms C, eyes D, and springs E are covered and protected by tubular caps F, which are curved to correspond with the curve of the arms C and plate A, and which are slotted upon their inner sides to receive the edges of the plate A, to serve as guides to the said plate, as it moves out and in. To the ends of the forward edge of the plate A are attached or upon them are formed eyes G to receive the blinder-reins, by which the blinder-plates are drawn forward to cover the horse's eyes. The blinder-reins are attached to the right and left rings of the bit, cross the horse's nose, pass through the eyes G of the left and right blinders, cross the horse's forehead, pass through guide-rings attached to the side straps of the head-stall below the horse's ears, pass back through the rein-terrets, and pass back along the reins into such a position that they can be conveniently reached and operated by the driver when required to draw forward and close the blinders. The ends of the blinder-reins pass through rings attached to the driving-reins, and have cross-bars or knobs attached to them to prevent them from being drawn out of said rings, so that they may always be within convenient reach of the driver, and at the same time may not interfere with the ordinary use of the driving-reins.

Having thus described my invention, what I claim as new, and desire to secure by Letters Patent, is—

The combination of the plate A $a'$, bar B, arms C, eyes D, coiled springs E, caps F, and eyes G, with each other, to adapt them for use, substantially as herein shown and described, and for the purpose set forth.

RUDOLPH LEHMICKE.

Witnesses:
  A. M. DODD,
  WM. M. McCLUER.